(12) United States Patent
Kwon et al.

(10) Patent No.: US 8,900,396 B2
(45) Date of Patent: Dec. 2, 2014

(54) METHOD FOR FORMING A VENT PORT IN A GLASS PANEL, AND GLASS PANEL PRODUCT MANUFACTURED USING THE SAME

(75) Inventors: Soon-Ho Kwon, Gwangmyeong-si (KR); Su-bin Song, Uiwang-si (KR)

(73) Assignee: LG Hausys, Ltd., Seoul (KR)

( * ) Notice: Subject to any disclaimer, the term of this patent is extended or adjusted under 35 U.S.C. 154(b) by 223 days.

(21) Appl. No.: 13/392,274

(22) PCT Filed: Dec. 22, 2010

(86) PCT No.: PCT/KR2010/009199
§ 371 (c)(1),
(2), (4) Date: Feb. 24, 2012

(87) PCT Pub. No.: WO2011/083926
PCT Pub. Date: Jul. 14, 2011

(65) Prior Publication Data
US 2012/0148795 A1     Jun. 14, 2012

(30) Foreign Application Priority Data
Jan. 5, 2010   (KR) ........................ 10-2010-0000632

(51) Int. Cl.
| | |
|---|---|
| *H01J 9/38* | (2006.01) |
| *H01J 11/54* | (2012.01) |
| *H01J 11/48* | (2012.01) |
| *H01J 9/40* | (2006.01) |
| *H01J 9/385* | (2006.01) |
| *C03C 27/06* | (2006.01) |

(52) U.S. Cl.
CPC . *H01J 9/40* (2013.01); *H01J 11/54* (2013.01); *H01J 11/48* (2013.01); *H01J 2329/941* (2013.01); *H01J 9/385* (2013.01); *C03C 27/06* (2013.01)
USPC ........................................................ 156/293

(58) Field of Classification Search
CPC ............ H01J 11/54; H01J 11/48; H01J 9/38; H01J 9/40; C03C 27/06
USPC .......................................................... 156/293
See application file for complete search history.

(56) References Cited

U.S. PATENT DOCUMENTS 3,914,000 A  *  10/1975  Beckerman et al. ............ 445/25
4,182,540 A  *   1/1980  Frankland et al. .............. 445/25
(Continued)

FOREIGN PATENT DOCUMENTS

CN          1601040 A       3/2005
(Continued)

*Primary Examiner* — Jeff Aftergut
*Assistant Examiner* — Jaeyun Lee
(74) *Attorney, Agent, or Firm* — Nath, Goldberg & Meyer; Joshua B. Goldberg

(57) ABSTRACT

A method for forming a vent port in a glass panel and a glass panel product manufactured using the same. The vent port has no protruding vent pipe, such that the vent port discharging gas from a sealed space to the outside is formed in either one of a pair of plate glasses separated in a thickness-direction to form the sealed space therebetween, produced by: forming an exhaust hole in either one of the plate glasses; vertically inserting a vent-pipe-type sealing material into the upper portion of the exhaust hole; discharging gas from a space between the plate glasses to the outside; heating the sealant member such that the sealing material is converted into fluid and the exhaust hole is closed by the sealing material having collapsed after being heated; and solidifying the sealing material remaining in the exhaust hole, ensuring good sealing properties without using a protruding vent pipe.

6 Claims, 9 Drawing Sheets

(56) References Cited

U.S. PATENT DOCUMENTS

| | | | |
|---|---|---|---|
| 7,966,787 B2 * | 6/2011 | Guo et al. | 53/405 |
| 2005/0206299 A1 | 9/2005 | Nakamura et al. | |
| 2006/0154008 A1 | 7/2006 | Suzuki et al. | |
| 2008/0238821 A1 * | 10/2008 | Miyata et al. | 345/60 |
| 2009/0313946 A1 | 12/2009 | Guo et al. | |

FOREIGN PATENT DOCUMENTS

| | | |
|---|---|---|
| JP | 11-021150 A | 1/1999 |
| JP | 2000-044291 A | 2/2000 |
| JP | 2001-172059 A | 6/2001 |
| JP | 2002-012455 A | 1/2002 |
| JP | 2002226235 A | 8/2002 |
| JP | 2003095680 A | 4/2003 |
| JP | 2004149343 A | 5/2004 |
| JP | 2004339010 A | 12/2004 |
| KR | 10-2011-0077893 A | 7/2011 |
| WO | 2004099097 A1 | 11/2004 |

* cited by examiner

METHOD FOR FORMING A VENT PORT IN A GLASS PANEL, AND GLASS PANEL PRODUCT MANUFACTURED USING THE SAME

This is a National Phase Application filed under 35 U.S.C. 371 as a national stage of PCT/KR2010/009199, filed on Dec. 22, 2010, an application claiming the benefit from Korean Application No. 10-2010-0000632 filed on Jan. 5, 2010, the entire content of each of which is hereby incorporated by reference in its entirety.

TECHNICAL FIELD

The present invention relates to technology for forming a glass panel (for example, vacuum pair glass, plasma display panels, etc.) with a space between a pair of plate glasses decompressed (or sealed with gas), forming a vent port in a glass panel body to be used when decompressing the space, and sealing the vent port after decompression of the space.

BACKGROUND ART

Generally, when a vent port for discharging gas from a sealed space between a pair of plate glasses separated in a thickness direction is formed in either one of the pair of plate glasses, an exhaust hole is formed through the plate glass and a vent pipe is then vertically inserted into the exhaust hole.

Further, a sealant is interposed and heated to melt in a joining portion between a lower end of the vent pipe and an upper circumference of the exhaust hole on the plate glass, so that the sealant flows and is solidified to form a sealing member, thereby completing a vent port in the glass panel.

Then, decompression is performed by discharging gas from a space between the plate glasses through the vent port, followed by heating the glass pipe to close and seal a leading end of the glass pipe. Thus, the vent pipe inevitably protrudes from the surface of the glass panel.

FIGS. 1a to 1c are cross-sectional views of a conventional method for forming a vent port.

Referring to FIG. 1a, an exhaust hole 5, 6 is formed at one side of an upper plate glass 18.

Referring to FIG. 1b, a vent pipe 7 is inserted into an upper portion 6 of the exhaust hole and a sealant 8 is placed in a joining portion between the vent pipe 7 and the upper plate glass 18.

Referring to FIG. 1c, the sealant 8 is heated to melt and flow, and is then solidified to form a sealing member 19, thereby forming a vent port in the plate glass.

Then, gas is discharged from a space between the plate glasses through the vent port, and an upper portion of the vent port 7 is sealed.

FIGS. 2a and 2b are cross-sectional views of a conventional method of closing a vent port.

Referring to FIG. 2a, the top of the vent port 7 having the seal member 19 is covered with a cover 61 having an inlet for decompression.

Then, an upper portion of the vent pipe 7 is heated using a heater 62 while discharging gas from the space between the plate glasses 14, 18 through the inlet provided at one side of the cover 61.

Here, a sealant 15 is interposed between the plate glasses 14, 18 to block gas introduced from the outside while maintaining an interior space.

Referring to FIG. 2b, the upper portion of the vent pipe 7 is melted and closed.

The conventional method for forming and sealing the vent port on the plate glass has a problem of limiting processability when the plate glasses are subjected to post-processing, such as joining, multilayer processing, and the like, since a glass pipe used as a vent pipe protrudes from the surface of one of the sheets of plate glass.

Particularly, when the vent pipe is broken during a process of stacking or post-processing the plate glasses, vacuum or decompression in the space between the plate glasses is damaged. In order to prevent this problem, a protective cap may be further provided to the sealed upper portion of the vent port.

FIG. 3 is a cross-sectional view of a conventional protective cap for a vent port.

In FIG. 3, a protective cap 70 is provided to a protruding vent port including a sealing member 19 and a sealed glass pipe 7. In this case, the vent port can be protected from damage in post-processing, but there are limits in joining and multilayer processing.

In addition, for a conventional method for sealing the vent pipe, the glass pipe is heated to melting point. At this time, since the glass pipe must be heated above a softening point of general plate glass, the plate glass for the glass panel can disadvantageously be deformed.

FIG. 4 is a cross-sectional view of a glass panel which undergoes deformation during a process of sealing a vent port.

Referring to FIG. 4, a protruding vent port is formed on a glass panel including a sealant 15 and spacers 16 between two plate glasses 14, 18. At this time, a sealing member 19 is formed to seal an interface between the vent pipe 7 of the protruding vent port and the upper plate glass 18, and the sealant is heated and melts at a temperature above the softening point of the plate glass, causing damage of the upper plate glass 18.

To solve such problems, a vent port for decompressing a space between plate glasses when manufacturing a glass panel must be formed as low as possible, and studies have been conducted to develop a technique for efficiently sealing the vent port without damaging the glass panel. However, attractive results have not been achieved in the art.

DISCLOSURE

Technical Problem

The present invention is directed to solving such problems in the art, and provide a method for forming a vent port in a glass panel and a glass panel product manufactured using the same, in which an exhaust hole is formed in a funnel shape and a sealant member having a vent pipe shape is provided to discharge gas from the glass panel through the sealant member while the sealant member is melted to seal the exhaust hole, thereby guaranteeing good sealing properties without forming a protruding vent port.

Technical Solution

An aspect of the present invention provide a method for forming a vent port in a glass panel such that the vent port for discharging gas from a sealed space to the outside is formed in either one of a pair of plate glasses separated from each other in a thickness direction to form the sealed space therebetween. The method includes: forming an exhaust hole in either one of the plate glasses; vertically inserting a vent pipe-shaped sealant member into an upper portion of the exhaust hole; discharging gas from the space between the plate glasses to the outside; heating the sealant member such that the sealant member becomes a fluid and the exhaust hole is closed by the sealant member having collapsed after being heated; and solidifying the sealant member remaining in the exhaust hole to ensure good sealing properties.

The sealant member may include an outer diameter of 5 mm or less and an inner diameter of 1 mm or more.

The exhaust hole may have a cross-section of a funnel shape or a stepped shape, which has a wide upper portion and a narrow lower portion. The exhaust hole may have a maximum diameter greater than the outer diameter of the sealant member by 0.5 mm or more, and a minimum diameter smaller than the outer diameter of the sealant member by 0.5 mm or more.

The sealant member may include a material having a lower softening point than the plate glass by 100° C. or more.

Another aspect of the invention provides a glass panel product manufactured using the method and having a flat type vent port without a protrusion.

Advantageous Effects

According to exemplary embodiments, in the method for forming a vent port in a glass panel, decompression is performed through a sealant member having a vent pipe shape and the sealant member is then heated to seal an exhaust hole, thereby preventing a protruding portion from being formed on the vent port and minimizing limits due to the protruding portion during post-processing such as joining, multilayer processing, and the like.

Further, the sealant member used to seal the vent port has a lower melting point than the plate glass. Thus, the sealant member is melted at a lower temperature than a conventional sealant member when sealing the vent port, so that energy consumption can be reduced in a sealing process and the glass panel can be prevented from being deformed, thereby improving productivity.

[Brief Description of Reference Numerals]

Figure 1A:
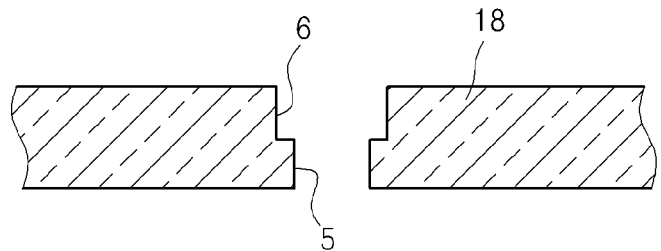
FIGS. 1a to 1c are cross-sectional views of a conventional method for forming the vent port.
Figure 1B:
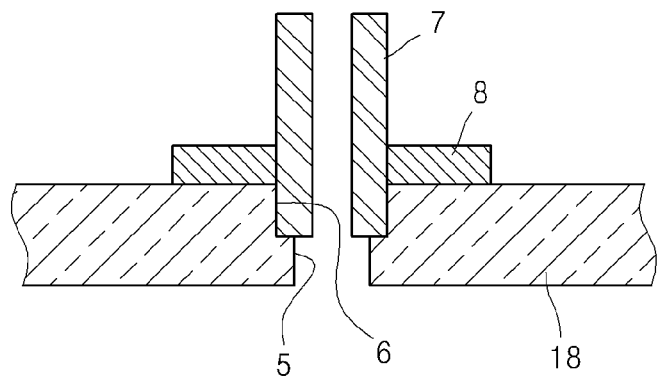
Figure 1C:
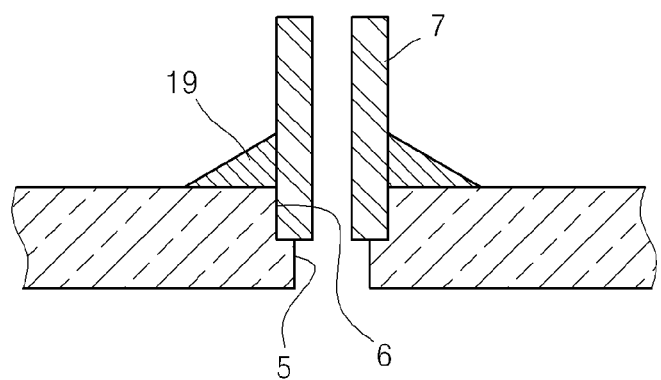
Figure 2A:
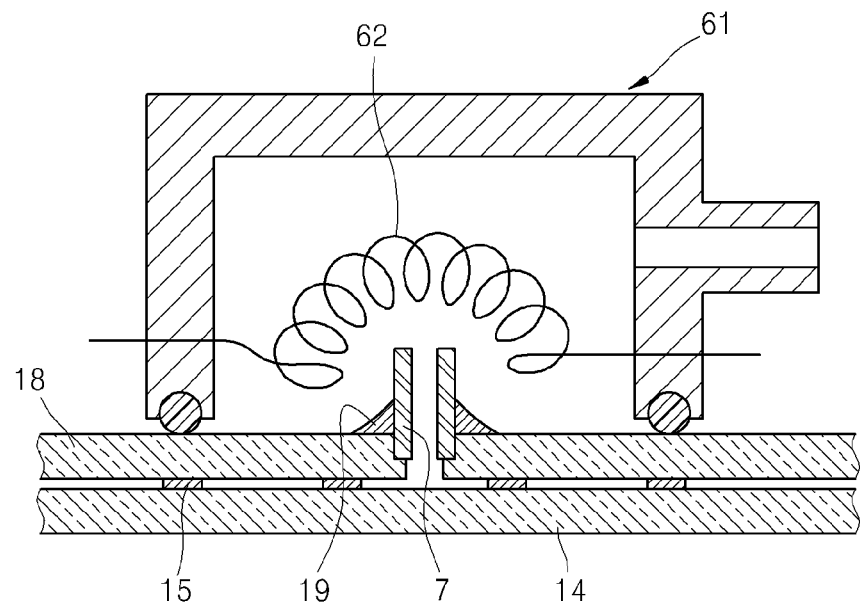
FIGS. 2a and 2b are cross-sectional views of a conventional method of closing the vent port.
Figure 2B:
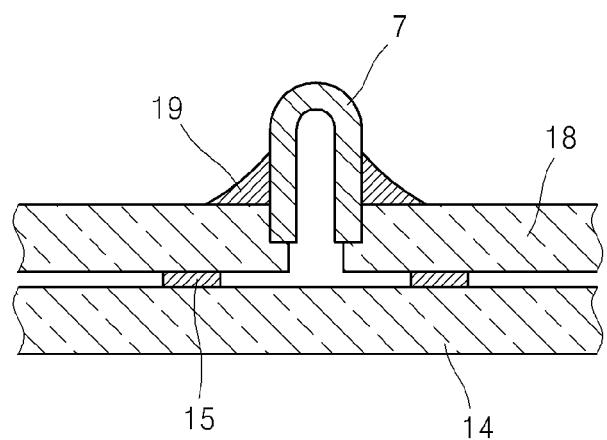
Figure 3:
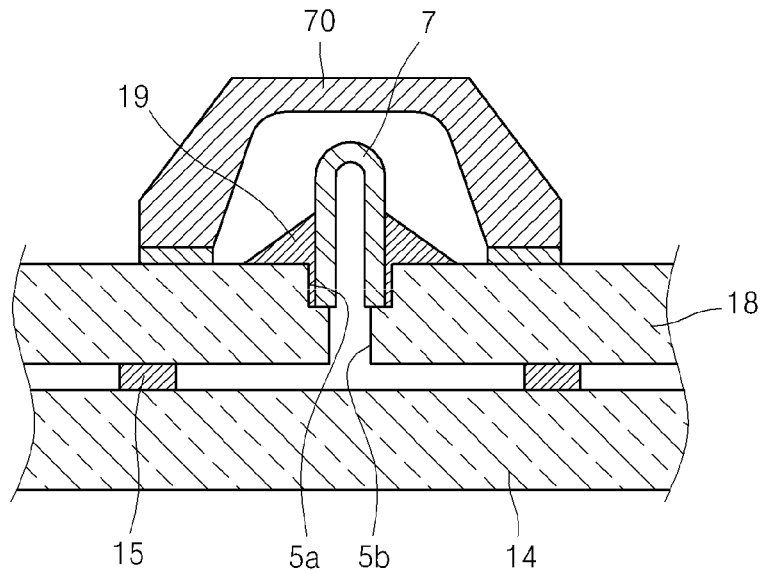
FIG. 3 is a cross-sectional view of a conventional protective cap for a vent port.
Figure 4:
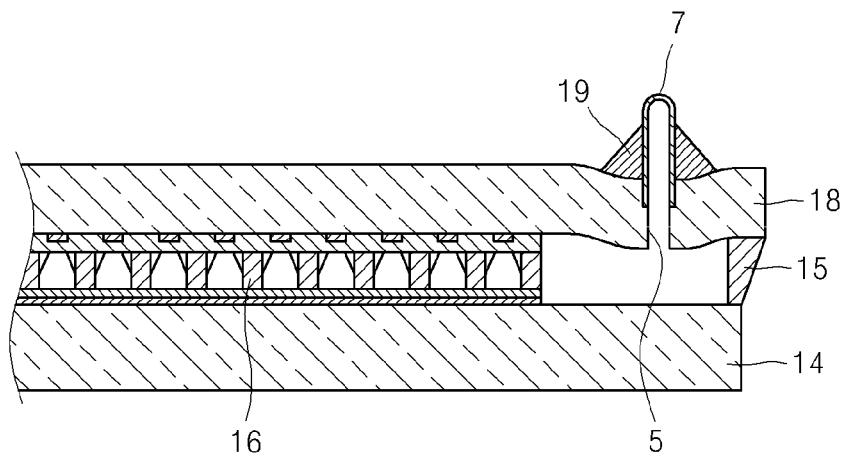
FIG. 4 is a cross-sectional view of a glass panel which undergoes deformation during a process of sealing a vent port.

100, 200, 300, 400, 500: upper plate glass
110, 210, 310, 410: exhaust hole     120, 220: guide slope
130, 230, 330, 430: sealant member
140: heater                           130a: sealing member
130b: vent filling member
150, 240, 340, 440: vent sealing member

[Brief Description of Reference Numerals]

320: single-stepped exhaust hole     420: double-stepped exhaust hole
520: exhaust port                     580: corner sealant member
590: lower plate glass

BEST MODE

Exemplary embodiments of the present invention will now be described in detail with reference to the accompanying drawings.

The above and other aspects, features, and advantages of the invention will become apparent from the following detailed description of exemplary embodiments in conjunction with the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited by the accompanying claims and equivalents thereof. Like elements will be indicated by like reference numerals throughout the specification.

FIGS. 5a to 5f are cross-sectional views of a method for forming an exhaust hole in a glass panel according to a first exemplary embodiment.

Figure 5A:
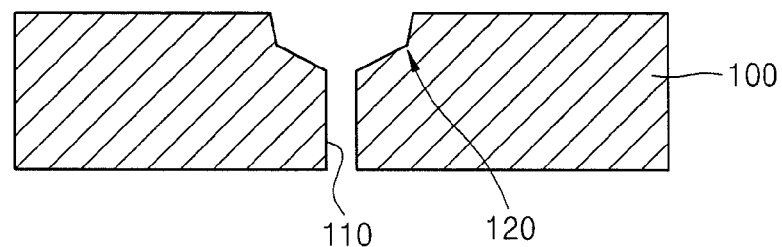
FIGS. 5a to 5f are cross-sectional views of a method for forming an exhaust hole in a glass panel according to a first exemplary embodiment of the present invention.

Referring to FIG. 5a, as a first characteristic element, a vent port for decompressing and sealing a space between a pair of plate glasses is formed in either one of the pair of plate glasses separated from each other in a thickness direction. For convenience of description, the plate glass formed with the vent port will be called an upper plate glass 100, and a cross-section of only a part of the plate glass having the vent port is illustrated.

As shown therein, an exhaust hole 110, 120 is formed at one side of the upper plate glass 100 in the thickness direction. In this exemplary embodiment, the exhaust hole 110, 120 is formed in a funnel shape, a diameter of which is gradually decreased from top to bottom.

The funnel structure of the exhaust hole 110,120 allows a heated and molten sealant member to naturally flow into and seal the exhaust hole 110, 120.

Thus, the exhaust hole may be formed with a guide slope 120 near the surface of the plate glass 100 and the guide slope 120 may have various shapes in accordance with processing conditions of the glass panel.

Figure 6A:
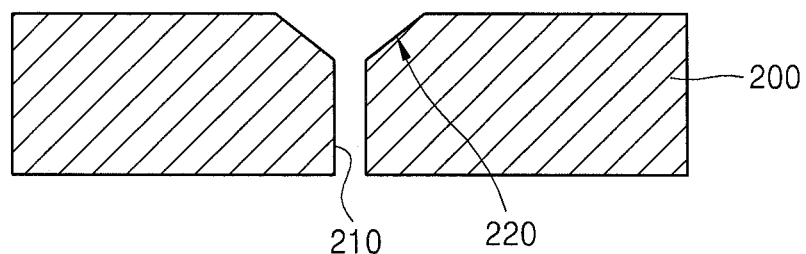
FIGS. 6a to 6c are cross-sectional views of a method for forming an exhaust hole in a glass panel according to a second exemplary embodiment of the present invention.

FIG. 5a shows two slopes, planes of which form two concentric circles; FIG. 6a shows a single slope; and FIGS. 7 and 8 show stepped slopes. These exemplary embodiments will be described in more detail with reference to the drawings.

Figure 5B:
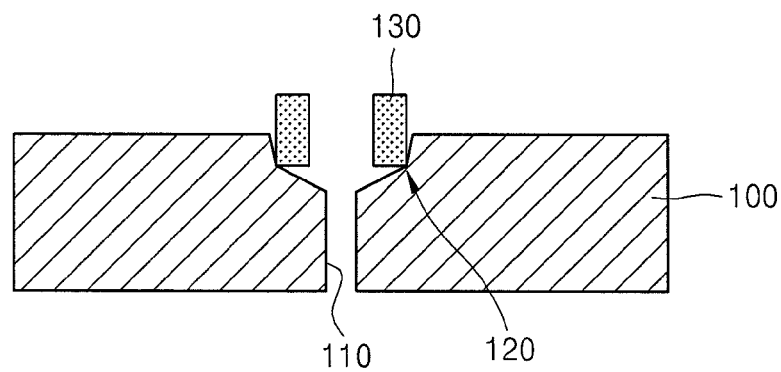

Referring to FIG. 5b, a sealant member 130 having a vent pipe shape is inserted into the exhaust hole 110, 120 along the guide slope 120.

In this embodiment, instead of a conventional vent pipe, the sealant member 130 having a vent pipe shape is used in order to form a non-protruding vent port. Here, the sealant member 130 having a vent pipe shape need not be as high as the conventional vent pipe since a decompression process for the glass panel according to the exemplary embodiment is performed in a vacuum chamber or in a local vacuum environment around the exhaust hole. Further, the sealant member 130 may protrude within the range of 0.5 to 2 mm from the surface of the upper plate glass 100 since it is important to seal the exhaust hole 110, 120 by the sealant member 130 in a post-process. With the sealant member 130 inserted into the guide slope 120, if the difference in height between the sealant member 130 and the surface of the plate glass 100 is less than 0.5 mm, the sealing process will not be efficiently carried out after the decompression process for the glass panel. On the other hand, if the difference in height between the sealant member 130 and the surface of the plate glass 100 is more than 2 mm, the sealant member 130 will be exposed to the surface of the upper plate glass 100 in the post-process.

Further, the sealant member 130 according to this exemplary embodiment may have various shapes such as a ring, a funnel, etc., and have a heterogeneous structure wherein a portion adjoining the upper plate glass 100 has a lower softening point than a portion not adjoining the upper plate glass 100.

Particularly, when the sealant member 130 has a vent pipe shape, the sealant member 130 may have an outer diameter of 5 mm or less and an inner diameter of 1 mm or more. If the outer diameter of the sealant member 130 exceeds 5 mm, the sealant member can protrude from the surface of the glass after sealing. As such, the inner diameter of the sealant member 130 is set to 1 mm or more to ensure a space through which gas can be efficiently discharged from the interior of the glass panel during the decompression process.

Then, the space in the glass panel is subjected to decompression using a vacuum chamber or local vacuum device. When manufacturing plasma display panels or other glass panel products, a gas-filling process is performed after the decompression process.

The sealant member 130 may have the heterogeneous structure wherein a portion adjoining the upper plate glass 100 has a lower softening point than a portion not adjoining the upper plate glass 100

Thus, the sealant member 130 may be easily dispersed along the guide slope 120 when heated, melted and fluidized, and also have improved adhesion, thereby providing good sealing effects.

Figure 5C:
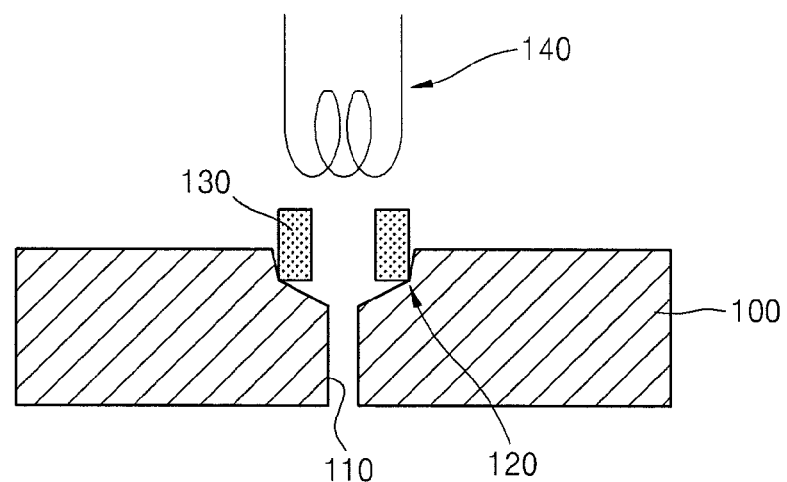
Figure 5D:
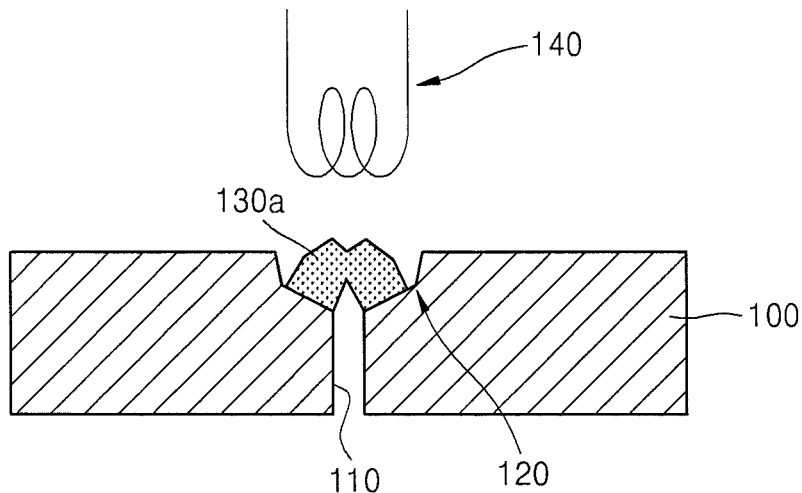

Referring to FIGS. 5c and 5d, in a heating process, the sealant member 130 is heated by a heater 140 and becomes a sealing member 130a, which is formed by joining upper portions of two pieces of the sealant member 130 to each other to seal an upper portion of the exhaust hole. Here, the sealant member 130 may be composed of a material having a softening point lower than that of the plate glass for the glass panel by 100☐ or more, so that heating and sealing can be carried out at a temperature lower than a conventional temperature. Thus, it is possible to reduce energy consumption in the sealing process and to prevent deformation of the glass panel, thereby maximizing productivity.

Figure 5E:
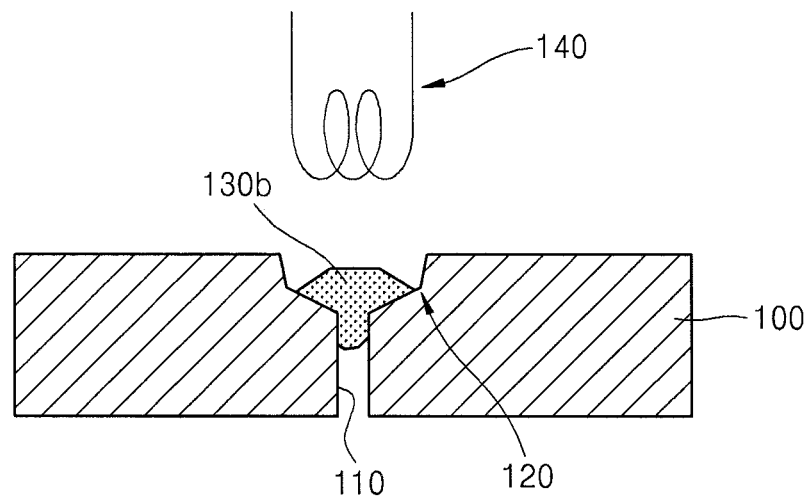

Referring to FIG. 5e, the sealing member 130a is melted by the heater 140 to flow down and fill a lower portion 110 of the exhaust hole, thereby providing a vent filling member 130b.

Figure 5F:
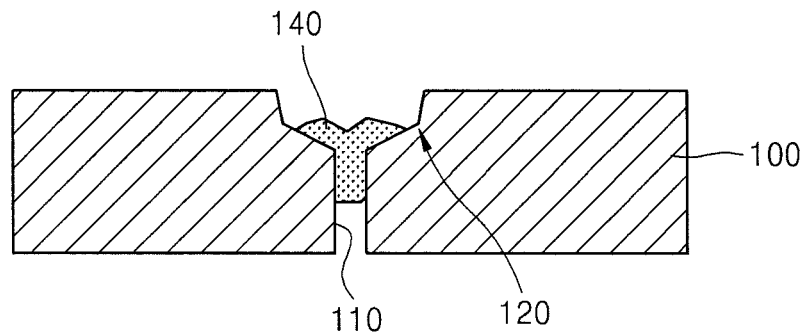

Referring to FIG. 5f, the heater 140 is removed and the vent filling member 130b is solidified to form a vent sealing member 150, thereby completely sealing the vent port.

As such, the sealant member is heated to seal the exhaust hole, so that a protruding portion of the vent port may be minimized and limits due to the protruding portion may be minimized in post-processes such as joining, multilayer processing, and the like. According to this embodiment, the vent sealing member 150 may be completely prevented from being exposed to the surface of the upper plate glass 100. However, the sealant member may be minimally heated to reduce energy consumption in the process of FIG. 5d or 5e, and thus the vent sealing member 150 may partially protrude from the surface of the upper plate glass. Nevertheless, such protrusion does not affect the method for forming a vent port according to the exemplary embodiment so long as the protrusion is within an acceptable range of 0.5 mm.

Although the method according to the exemplary embodiment of the invention has been described above, the method may be realized in various ways according to the shapes of the guide slope of the exhaust hole.

Figure 6B:
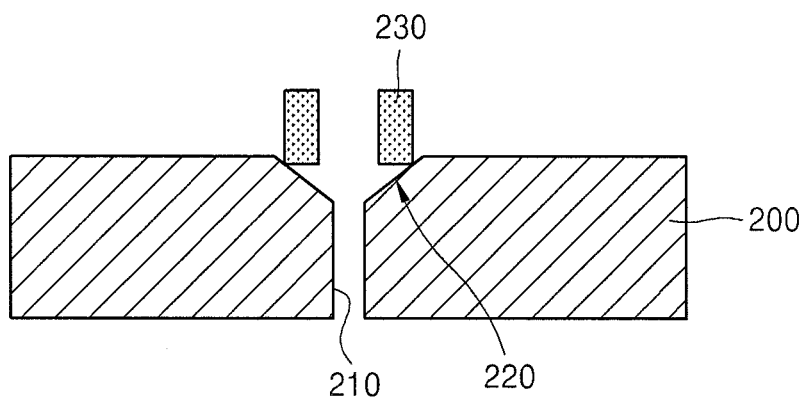
Figure 6C:
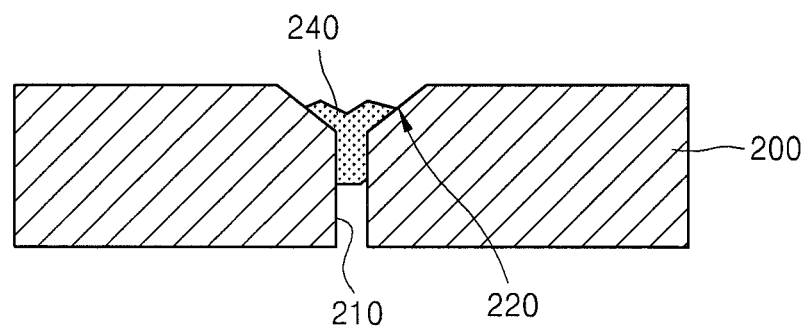

FIGS. 6a to 6c are cross-sectional views of a method for forming an exhaust hole in a glass panel according to a second exemplary embodiment of the present invention.

Referring to FIG. 6a, a general funnel-shaped exhaust hole 210, 220 is shown, in which an upper plate glass 220 has a single slope 220.

Referring to FIG. 6b, a sealant member 230 having a vent pipe shape is placed on the single slope 220. As soon as the sealant member 230 is placed thereon, a heating process is performed to allow a lower portion of the sealant member 230 to melt and be adhered to the single slope 220 while allowing a decompression process to be smoothly performed.

Referring to FIG. 6c, a vent sealing member 240 is formed in the exhaust hole 210 having the single slope 220. Here, the depth of the vent sealing member 240 may be freely adjusted according to an inclined angle of the single slope 220, thereby controlling vacuum reliability of the glass panel.

Figure 7A:
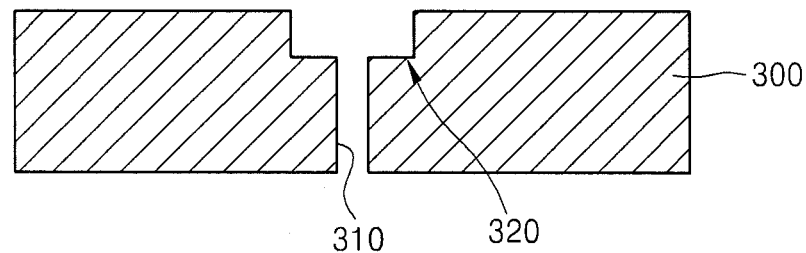
FIGS. 7a to 7c are cross-sectional views of a method for forming an exhaust hole in a glass panel according to a third exemplary embodiment of the present invention.
Figure 7B:
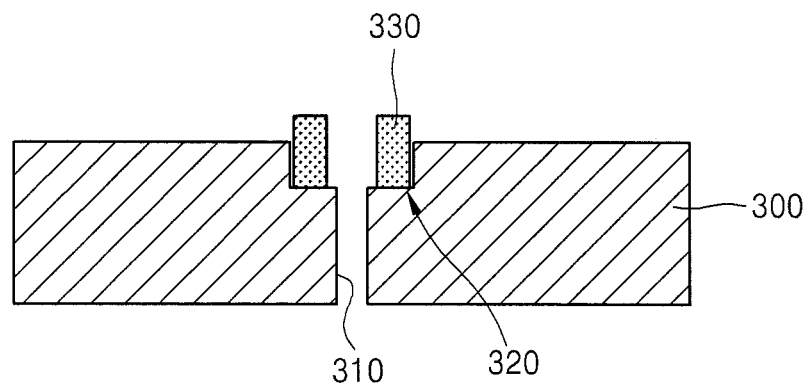
Figure 7C:
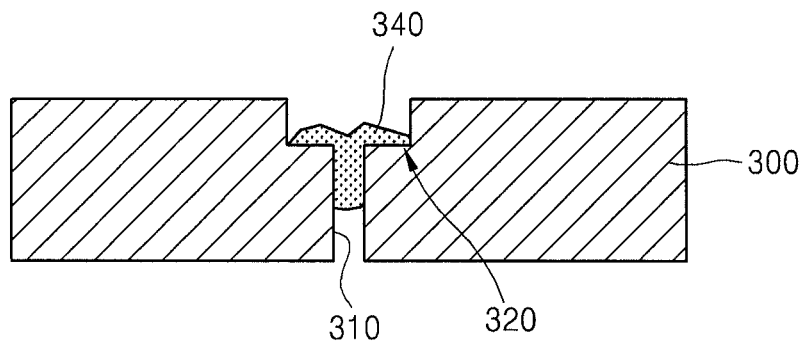

FIGS. 7a to 7c are cross-sectional views of a method for forming an exhaust hole in a glass panel according to a third exemplary embodiment of the present invention.

Referring to FIGS. 7a to 7c, a single-stepped exhaust hole 310, 320 is formed in an upper plate glass 300, and a sealant member 330 is used to completely seal a lower portion 310 of the exhaust hole and becomes a vent sealing member 340.

Such a configuration of the exhaust hole 310, 320 increases a contact area between the sealant member 330 and the exhaust hole when the sealant member 330 is initially heated, thereby improving reliability of the decompression process.

Figure 8A:
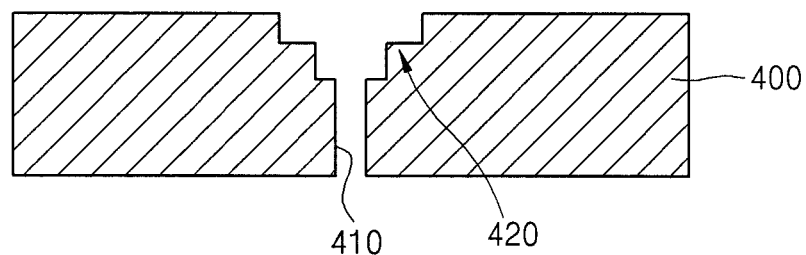
FIGS. 8a to 8c are cross-sectional views of a method for forming an exhaust hole in a glass panel according to a fourth exemplary embodiment of the present invention.
Figure 8B:
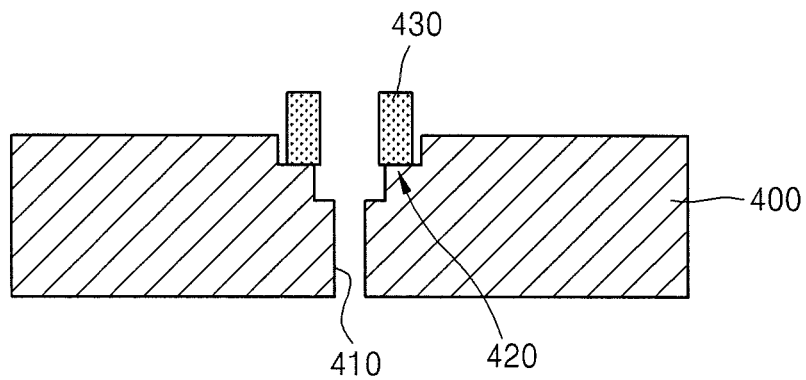
Figure 8C:
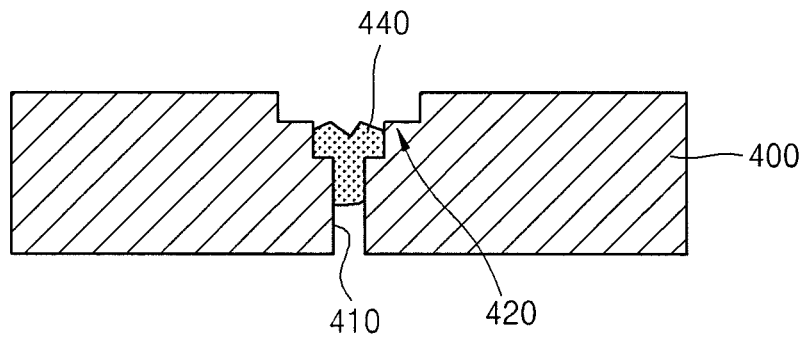

FIGS. 8a to 8c are cross-sectional views of a method for forming an exhaust hole in a glass panel according to a fourth exemplary embodiment of the present invention.

Referring to FIGS. 8a to 8c, a double-stepped exhaust hole 410, 420 is formed in an upper plate glass 400, and a sealant member 430 is used to completely seal a lower portion 410 of the exhaust hole and becomes a vent sealing member 440.

Such a configuration of the exhaust hole 410, 420 increases a contact area between the sealant member 430 and the exhaust hole when the sealant member 330 is initially heated, thereby improving reliability of the decompression process.

In addition, a stepped slope allows the sealant member 430 to be more easily guided to the lower portion 410 of the exhaust hole when heated, and allows the vent sealing member 440 to have a more stable structure than a general slope.

As described above, the method for forming a vent port in a glass panel according to the present invention may be realized in various ways, and glass panel products using the same may be manufactured as follows.

Figure 9:
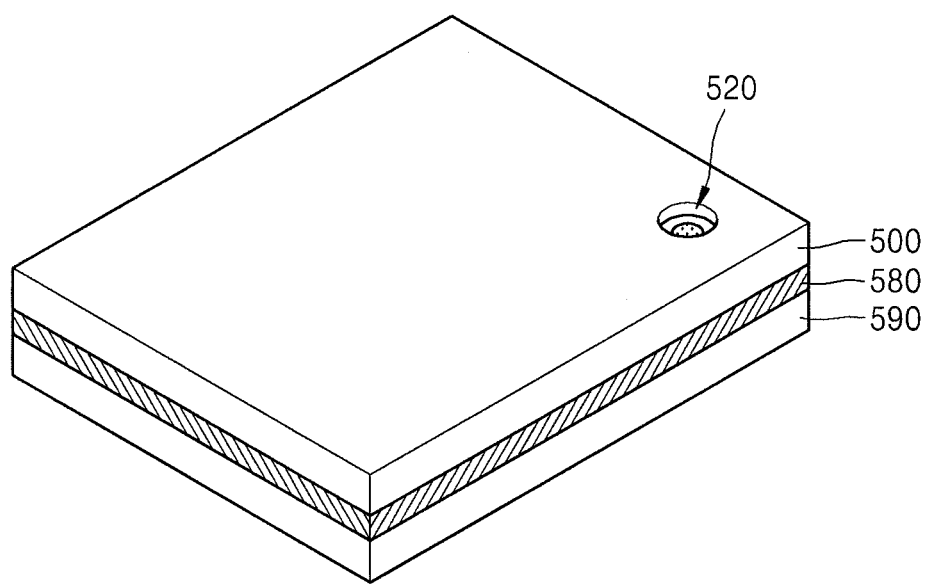
FIG. 9 is a perspective view of a glass panel, according to an exemplary embodiment of the present invention.

FIG. 9 is a perspective view of a glass panel according to an exemplary embodiment of the present invention.

Referring to FIG. 9, a corner sealant member 580 is formed between an upper plate glass 500 and a lower plate glass 590, and an exhaust port 520 is formed for decompressing a space between the plate glasses 500, 590. Here, the exhaust port 520 may include a vent sealing member and may have a height similar to the surface height of the upper plate glass 500.

For the glass panel product according to this embodiment, a sealant member may have a higher melting point than the corner sealant member 580. When the sealant member has a higher melting point than the corner sealant member 580, the vent sealing member may be prevented from being closed in a process of sealing the corner of the glass panel before decompression, thereby decreasing defects and increasing productivity.

Although some embodiments have been described with reference to the accompanying drawings, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A method for forming a vent port in a glass panel, the vent port discharging gas from a sealed space to the outside and being formed in either one of a pair of plate glasses which are separated from each other in a thickness direction to form the sealed space therebetween, the method comprising:

forming an exhaust hole in either one of the plate glasses;

vertically inserting a vent pipe-shaped sealant member into an upper portion of the exhaust hole, wherein the sealant member comprises a heterogeneous structure and wherein a portion thereof adjoining the plate glass has a lower softening point than a portion not adjoining the plate glass;

discharging gas from a space between the plate glasses to the outside;

heating the sealant member such that the sealant member becomes a fluid and the exhaust hole is closed by the sealant member having collapsed after being heated; and solidifying the sealant member remaining in the exhaust hole to ensure good sealing properties.

2. The method of claim 1, wherein the sealant member has an outer diameter of 5 mm or less and an inner diameter of 1 mm or more.

3. The method of claim 1, wherein the exhaust hole has a cross-section of a funnel shape having a slope at an upper portion thereof.

4. The method of claim 3, wherein the slope of the exhaust hole has a stepped shape.

5. The method of claim 3, wherein the exhaust hole has a maximum diameter greater than the outer diameter of the sealant member by 0.5 mm or more, and a minimum diameter less than the outer diameter of the vent-pipe-type sealant member by 0.5 mm or more.

6. The method of claim 1, wherein the sealant member comprises a material having a lower softening point than the plate glass by 100° C. or more.

* * * * *